United States Patent
DeHaan et al.

(10) Patent No.: US 9,558,195 B2
(45) Date of Patent: Jan. 31, 2017

(54) DEPOPULATION OF USER DATA FROM NETWORK

(75) Inventors: Michael Paul DeHaan, Morrisville, NC (US); Adrian Karstan Likins, Raleigh, NC (US); Seth Kelby Vidal, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1146 days.

(21) Appl. No.: 12/395,456

(22) Filed: Feb. 27, 2009

(65) Prior Publication Data
US 2010/0223369 A1 Sep. 2, 2010

(51) Int. Cl.
*G06F 15/173* (2006.01)
*G06F 17/30* (2006.01)

(52) U.S. Cl.
CPC .............................. *G06F 17/30117* (2013.01)

(58) Field of Classification Search
CPC ...................... G06F 17/30117; G06F 17/30575
USPC ........................................................ 709/223
See application file for complete search history.

(56) References Cited

U.S. PATENT DOCUMENTS

| | | | |
|---|---|---|---|
| 5,787,246 A | 7/1998 | Lichtman et al. | |
| 5,835,719 A | 11/1998 | Gibson et al. | |
| 5,948,062 A | 9/1999 | Tzelnic et al. | |
| 5,991,758 A * | 11/1999 | Ellard | G06F 17/30321 |
| 6,105,100 A | 8/2000 | Dean et al. | |
| 6,212,585 B1 | 4/2001 | Chrabaszcz | |
| 6,240,407 B1 * | 5/2001 | Chang | G06F 17/30911 |
| | | | 707/711 |
| 6,243,747 B1 | 6/2001 | Lewis et al. | |
| 6,269,405 B1 * | 7/2001 | Dutcher et al. | 709/248 |
| 6,272,536 B1 | 8/2001 | van Hoff et al. | |
| 6,282,652 B1 | 8/2001 | Scheifler | |
| 6,381,742 B2 | 4/2002 | Forbes et al. | |
| 6,415,289 B1 | 7/2002 | Williams et al. | |
| 6,438,711 B2 | 8/2002 | Woodruff | |

(Continued)

OTHER PUBLICATIONS

Engine. Microsoft® Computer Dictionary, Fifth Edition [online]. Microsoft Press, May 1, 2002. Retrieved on Sep. 29, 2010. Retrieved from the Internet: <URL:http://proquest.safaribooksonline.com/0735614954>.*

(Continued)

*Primary Examiner* — Philip Chea
*Assistant Examiner* — Wing Ma
(74) *Attorney, Agent, or Firm* — Lowenstein Sandler LLP

(57) ABSTRACT

Embodiments relate to systems and methods for depopulation of user data from a network. A network management platform can communicate with a set of managed machines in a network, and generally manage user accounts including user IDs, associated network processes, services, application files, data files, and/or other user data. In embodiments, a user may have a change in status, such as departing from the organization operating the network, changing their name or user name, or other updates. In such cases, a systems administrator may need to update or delete files, processes, services, and/or other user data associated with the user from the network. The network management platform can interrogate the network for files, processes, or other resources associated with the user ID of interest. The search can exhaustively interrogate every available node in the network, to update or purge all files associated with the subject user ID(s).

18 Claims, 4 Drawing Sheets

(56) References Cited

U.S. PATENT DOCUMENTS

| | | | |
|---|---|---|---|
| 6,477,572 B1 | 11/2002 | Elderton et al. | |
| 6,496,831 B1* | 12/2002 | Baulier et al. | |
| 6,516,427 B1 | 2/2003 | Keyes et al. | |
| 6,526,442 B1 | 2/2003 | Stupek et al. | |
| 6,550,021 B1 | 4/2003 | Dalphy et al. | |
| 6,557,169 B1 | 4/2003 | Erpeldinger | |
| 6,594,664 B1 | 7/2003 | Estrada et al. | |
| 6,611,869 B1 | 8/2003 | Eschelbeck et al. | |
| 6,625,742 B1 | 9/2003 | Owhadi et al. | |
| 6,678,888 B1 | 1/2004 | Sakanishi | |
| 6,686,838 B1 | 2/2004 | Rezvani et al. | |
| 6,691,225 B1 | 2/2004 | Suffin | |
| 6,745,189 B2* | 6/2004 | Schreiber | G06F 17/30321 707/696 |
| 6,751,659 B1 | 6/2004 | Fenger et al. | |
| 6,757,837 B1 | 6/2004 | Platt et al. | |
| 6,769,022 B1 | 7/2004 | DeKoning et al. | |
| 6,779,004 B1 | 8/2004 | Zintel | |
| 6,845,464 B2 | 1/2005 | Gold | |
| 6,854,010 B1* | 2/2005 | Christian et al. | 709/223 |
| 6,865,737 B1 | 3/2005 | Lucas et al. | |
| 6,925,518 B2 | 8/2005 | Rudland et al. | |
| 6,941,518 B2 | 9/2005 | French et al. | |
| 6,947,939 B2 | 9/2005 | Fujibayashi et al. | |
| 6,965,886 B2* | 11/2005 | Govrin et al. | 706/45 |
| 6,966,058 B2 | 11/2005 | Earl et al. | |
| 6,986,033 B2 | 1/2006 | Miyamoto et al. | |
| 7,003,560 B1 | 2/2006 | Mullen et al. | |
| 7,013,461 B2 | 3/2006 | Hellerstein et al. | |
| 7,020,654 B1* | 3/2006 | Najmi | G06F 17/30345 |
| 7,036,010 B2 | 4/2006 | Wray | |
| 7,051,101 B1 | 5/2006 | Dubrovsky et al. | |
| 7,054,618 B1 | 5/2006 | McCullough | |
| 7,058,797 B2 | 6/2006 | Miyamoto et al. | |
| 7,082,460 B2 | 7/2006 | Hansen et al. | |
| 7,082,464 B2 | 7/2006 | Hasan et al. | |
| 7,107,330 B1 | 9/2006 | Hamilton et al. | |
| 7,127,742 B2 | 10/2006 | Kramer et al. | |
| 7,133,822 B1 | 11/2006 | Jacobson | |
| 7,165,109 B2 | 1/2007 | Chiloyan et al. | |
| 7,181,444 B2* | 2/2007 | Porter | G06F 17/3002 |
| 7,185,071 B2 | 2/2007 | Berg et al. | |
| 7,197,608 B2 | 3/2007 | Mikuma et al. | |
| 7,200,662 B2 | 4/2007 | Hasan et al. | |
| 7,200,845 B2 | 4/2007 | Morrison et al. | |
| 7,207,039 B2 | 4/2007 | Komarla et al. | |
| 7,213,065 B2 | 5/2007 | Watt | |
| 7,280,830 B2 | 10/2007 | Anderson et al. | |
| 7,284,042 B2 | 10/2007 | Beadles et al. | |
| 7,305,550 B2 | 12/2007 | Oliver et al. | |
| 7,310,669 B2 | 12/2007 | Webb et al. | |
| 7,315,826 B1 | 1/2008 | Guheen et al. | |
| 7,330,967 B1 | 2/2008 | Pujare et al. | |
| 7,340,637 B2 | 3/2008 | Nagoya | |
| 7,346,801 B2 | 3/2008 | Brunelle et al. | |
| 7,350,112 B2 | 3/2008 | Fox et al. | |
| 7,356,679 B1 | 4/2008 | Le et al. | |
| 7,383,433 B2 | 6/2008 | Yeager et al. | |
| 7,395,322 B2 | 7/2008 | Harvey et al. | |
| 7,401,137 B1* | 7/2008 | Gasser et al. | 709/223 |
| 7,434,253 B2 | 10/2008 | Crall et al. | |
| 7,448,033 B1 | 11/2008 | Kruger et al. | |
| 7,469,284 B1* | 12/2008 | Dubrovsky et al. | 709/223 |
| 7,480,907 B1 | 1/2009 | Marolia et al. | |
| 7,506,040 B1 | 3/2009 | Rabe et al. | |
| 7,506,151 B2 | 3/2009 | Miyamoto et al. | |
| 7,509,487 B2 | 3/2009 | Lu et al. | |
| 7,516,218 B2 | 4/2009 | Besson | |
| 7,519,691 B2 | 4/2009 | Nichols et al. | |
| 7,548,985 B2* | 6/2009 | Guigui | 709/231 |
| 7,558,841 B2* | 7/2009 | Taboada | G06F 17/30893 705/26.62 |
| 7,574,413 B2* | 8/2009 | Larson et al. | 706/47 |
| 7,574,481 B2 | 8/2009 | Moore et al. | |
| 7,596,227 B2 | 9/2009 | Illowsky et al. | |
| 7,600,005 B2 | 10/2009 | Jamkhedkar et al. | |
| 7,600,113 B2 | 10/2009 | Kuehnel et al. | |
| 7,606,868 B1 | 10/2009 | Le et al. | |
| 7,627,617 B2 | 12/2009 | Kavuri et al. | |
| 7,640,325 B1 | 12/2009 | DeKoning et al. | |
| 7,653,008 B2 | 1/2010 | Patrick et al. | |
| 7,668,947 B2 | 2/2010 | Hutchinson et al. | |
| 7,671,735 B2 | 3/2010 | Karaoguz et al. | |
| 7,672,928 B2* | 3/2010 | Maloney | G06F 17/30336 707/715 |
| 7,673,130 B2 | 3/2010 | Miyamoto et al. | |
| 7,681,080 B2 | 3/2010 | Abali et al. | |
| 7,689,664 B2 | 3/2010 | Karlberg | |
| 7,716,224 B2* | 5/2010 | Reztlaff, II | G06F 17/30657 707/741 |
| 7,716,316 B2 | 5/2010 | Nichols et al. | |
| 7,734,717 B2 | 6/2010 | Saarimaki et al. | |
| 7,734,910 B2 | 6/2010 | Nasu | |
| 7,774,791 B1* | 8/2010 | Appelbaum et al. | 719/318 |
| 7,779,119 B2 | 8/2010 | Ginter et al. | |
| 7,787,863 B2 | 8/2010 | van de Groenendaal | |
| 7,792,986 B2 | 9/2010 | Donoho et al. | |
| 7,827,261 B1 | 11/2010 | Griswold et al. | |
| 7,827,590 B2 | 11/2010 | Hopen et al. | |
| 7,831,692 B2 | 11/2010 | French et al. | |
| 7,831,997 B2 | 11/2010 | Eldar et al. | |
| 7,937,437 B2 | 5/2011 | Fujii | |
| 7,971,047 B1 | 6/2011 | Vlaovic et al. | |
| 8,028,048 B2 | 9/2011 | Karve et al. | |
| 8,051,181 B2 | 11/2011 | Larson et al. | |
| 8,060,874 B2 | 11/2011 | Rengarajan et al. | |
| 8,069,341 B2 | 11/2011 | Fries et al. | |
| 8,073,908 B2 | 12/2011 | Heins et al. | |
| 8,078,728 B1 | 12/2011 | Pollan et al. | |
| 8,103,776 B2 | 1/2012 | DeHaan | |
| 8,103,783 B2 | 1/2012 | Plamondon | |
| 8,117,314 B2 | 2/2012 | Croft et al. | |
| 8,117,600 B1 | 2/2012 | Roeck et al. | |
| 8,131,825 B2 | 3/2012 | Nord et al. | |
| 8,131,851 B2 | 3/2012 | Harlow | |
| 8,132,166 B2 | 3/2012 | DeHaan | |
| 8,185,891 B2 | 5/2012 | DeHaan | |
| 8,205,240 B2 | 6/2012 | Ansari et al. | |
| 8,244,836 B2 | 8/2012 | DeHaan | |
| 8,271,975 B2 | 9/2012 | DeHaan | |
| 8,336,089 B1 | 12/2012 | Ahmed et al. | |
| 8,346,929 B1 | 1/2013 | Lai | |
| 8,355,407 B2 | 1/2013 | Wookey et al. | |
| 8,370,528 B2 | 2/2013 | Bryers et al. | |
| 8,407,687 B2 | 3/2013 | Moshir et al. | |
| 8,429,630 B2 | 4/2013 | Nickolov et al. | |
| 8,498,941 B2 | 7/2013 | Felsher | |
| 8,504,696 B2 | 8/2013 | Larson et al. | |
| 8,601,539 B1* | 12/2013 | Bobel | 726/2 |
| 8,713,177 B2 | 4/2014 | DeHaan et al. | |
| 8,875,249 B2* | 10/2014 | Ture | 726/1 |
| 9,081,816 B2* | 7/2015 | Krishnaprasad | |
| 2001/0047279 A1* | 11/2001 | Gargone | 705/1 |
| 2002/0062259 A1 | 5/2002 | Katz et al. | |
| 2002/0078186 A1 | 6/2002 | Engel et al. | |
| 2002/0095395 A1* | 7/2002 | Larson et al. | 706/47 |
| 2002/0099787 A1 | 7/2002 | Bonner et al. | |
| 2002/0111840 A1* | 8/2002 | Bagdonas et al. | 705/7 |
| 2002/0138567 A1 | 9/2002 | Ogawa | |
| 2002/0138578 A1 | 9/2002 | Zhou | |
| 2002/0162028 A1 | 10/2002 | Kennedy | |
| 2003/0005097 A1 | 1/2003 | Barnard et al. | |
| 2003/0055919 A1 | 3/2003 | Fong et al. | |
| 2003/0069884 A1 | 4/2003 | Nair et al. | |
| 2003/0069946 A1 | 4/2003 | Nair et al. | |
| 2003/0070110 A1 | 4/2003 | Aija et al. | |
| 2003/0074549 A1 | 4/2003 | Paul et al. | |
| 2003/0083922 A1* | 5/2003 | Reed | 705/9 |
| 2003/0110173 A1 | 6/2003 | Marsland | |
| 2003/0119480 A1 | 6/2003 | Mohammed | |
| 2003/0126585 A1 | 7/2003 | Parry | |
| 2003/0145083 A1 | 7/2003 | Cush et al. | |
| 2003/0195921 A1 | 10/2003 | Becker et al. | |
| 2003/0212992 A1 | 11/2003 | Ronning et al. | |

(56) References Cited

U.S. PATENT DOCUMENTS

| | | |
|---|---|---|
| 2003/0233648 A1 | 12/2003 | Earl et al. |
| 2004/0006616 A1 | 1/2004 | Quinn et al. |
| 2004/0015831 A1 | 1/2004 | Bowhill |
| 2004/0015957 A1 | 1/2004 | Zara et al. |
| 2004/0019876 A1 | 1/2004 | Dravida et al. |
| 2004/0024984 A1 | 2/2004 | Lanzatella et al. |
| 2004/0044643 A1 | 3/2004 | deVries et al. |
| 2004/0054789 A1 | 3/2004 | Breh et al. |
| 2004/0059703 A1 | 3/2004 | Chappell et al. |
| 2004/0064501 A1 | 4/2004 | Jan et al. |
| 2004/0088405 A1* | 5/2004 | Aggarwal ............... 709/224 |
| 2004/0128375 A1 | 7/2004 | Rockwell |
| 2004/0143664 A1 | 7/2004 | Usa et al. |
| 2004/0167975 A1 | 8/2004 | Hwang et al. |
| 2004/0215755 A1 | 10/2004 | O'Neill |
| 2004/0223469 A1 | 11/2004 | Bahl et al. |
| 2004/0226010 A1 | 11/2004 | Suorsa |
| 2005/0027608 A1 | 2/2005 | Wiesmuller et al. |
| 2005/0028025 A1 | 2/2005 | Zalewski et al. |
| 2005/0050175 A1 | 3/2005 | Fong et al. |
| 2005/0055350 A1 | 3/2005 | Werme et al. |
| 2005/0102154 A1* | 5/2005 | Dodd et al. ............... 705/1 |
| 2005/0108369 A1 | 5/2005 | Sather et al. |
| 2005/0114474 A1 | 5/2005 | Anderson et al. |
| 2005/0125525 A1 | 6/2005 | Zhou et al. |
| 2005/0177829 A1 | 8/2005 | Vishwanath |
| 2005/0182796 A1 | 8/2005 | Chu et al. |
| 2005/0198629 A1 | 9/2005 | Vishwanath |
| 2005/0223374 A1 | 10/2005 | Wishart et al. |
| 2005/0246421 A1* | 11/2005 | Moore et al. ............... 709/204 |
| 2006/0039340 A1 | 2/2006 | Ptasinski et al. |
| 2006/0041767 A1 | 2/2006 | Maxwell et al. |
| 2006/0080656 A1 | 4/2006 | Cain et al. |
| 2006/0080659 A1 | 4/2006 | Ganji |
| 2006/0095230 A1 | 5/2006 | Grier et al. |
| 2006/0095702 A1 | 5/2006 | Hickman et al. |
| 2006/0155857 A1 | 7/2006 | Feenan et al. |
| 2006/0173912 A1 | 8/2006 | Lindvall et al. |
| 2006/0174018 A1 | 8/2006 | Zhu et al. |
| 2006/0190575 A1 | 8/2006 | Harvey et al. |
| 2006/0190773 A1 | 8/2006 | Rao et al. |
| 2006/0200658 A1 | 9/2006 | Penkethman |
| 2006/0215575 A1 | 9/2006 | Horton et al. |
| 2006/0218544 A1 | 9/2006 | Chakraborty et al. |
| 2006/0230165 A1 | 10/2006 | Zimmer et al. |
| 2006/0282479 A1 | 12/2006 | Johnson et al. |
| 2007/0015538 A1 | 1/2007 | Wang |
| 2007/0067419 A1 | 3/2007 | Bennett |
| 2007/0073894 A1* | 3/2007 | Erickson ........... G06F 17/30864 709/230 |
| 2007/0078988 A1 | 4/2007 | Miloushev et al. |
| 2007/0101118 A1 | 5/2007 | Raghunath et al. |
| 2007/0118654 A1 | 5/2007 | Jamkhedkar et al. |
| 2007/0136265 A1* | 6/2007 | Hunt et al. ............... 707/4 |
| 2007/0168721 A1 | 7/2007 | Luiro et al. |
| 2007/0169093 A1 | 7/2007 | Logan et al. |
| 2007/0192158 A1 | 8/2007 | Kim |
| 2007/0204338 A1 | 8/2007 | Aiello et al. |
| 2007/0208745 A1* | 9/2007 | Ture ............... H04L 63/08 |
| 2007/0214129 A1* | 9/2007 | Ture ............... G06F 17/30864 |
| 2007/0220268 A1* | 9/2007 | Krishnaprasad .. G06F 17/30427 713/182 |
| 2007/0226810 A1 | 9/2007 | Hotti |
| 2007/0234337 A1 | 10/2007 | Suzuki et al. |
| 2007/0239858 A1 | 10/2007 | Banerji et al. |
| 2007/0244996 A1 | 10/2007 | Ahmed et al. |
| 2007/0276905 A1 | 11/2007 | Durand et al. |
| 2007/0288612 A1 | 12/2007 | Hall |
| 2007/0294369 A1 | 12/2007 | Ginter et al. |
| 2007/0294376 A1 | 12/2007 | Ayachitula et al. |
| 2007/0299951 A1 | 12/2007 | Krithivas |
| 2008/0002588 A1 | 1/2008 | McCaughan et al. |
| 2008/0016515 A1 | 1/2008 | Naim et al. |
| 2008/0028048 A1 | 1/2008 | Shekar CS et al. |
| 2008/0040452 A1 | 2/2008 | Rao et al. |
| 2008/0046708 A1 | 2/2008 | Fitzgerald et al. |
| 2008/0059959 A1 | 3/2008 | Chen et al. |
| 2008/0082467 A1* | 4/2008 | Meijer et al. ............... 706/12 |
| 2008/0130639 A1 | 6/2008 | Costa-Requena et al. |
| 2008/0170510 A1 | 7/2008 | Singh |
| 2008/0189693 A1 | 8/2008 | Pathak |
| 2008/0196043 A1 | 8/2008 | Feinleib et al. |
| 2008/0209033 A1 | 8/2008 | Ginter et al. |
| 2008/0215668 A1 | 9/2008 | Hu |
| 2008/0235266 A1 | 9/2008 | Huang et al. |
| 2008/0235361 A1 | 9/2008 | Crosbie et al. |
| 2008/0244325 A1 | 10/2008 | Tyulenev |
| 2008/0263543 A1 | 10/2008 | Ramachandran |
| 2008/0270674 A1 | 10/2008 | Ginzton |
| 2008/0288938 A1 | 11/2008 | DeHaan |
| 2008/0288939 A1 | 11/2008 | DeHaan |
| 2008/0294777 A1 | 11/2008 | Karve et al. |
| 2008/0298274 A1 | 12/2008 | Takashige et al. |
| 2008/0301666 A1 | 12/2008 | Gordon et al. |
| 2008/0301780 A1 | 12/2008 | Ellison et al. |
| 2008/0313716 A1 | 12/2008 | Park |
| 2008/0320110 A1 | 12/2008 | Pathak |
| 2009/0007091 A1 | 1/2009 | Appiah et al. |
| 2009/0055901 A1 | 2/2009 | Kumar et al. |
| 2009/0064132 A1 | 3/2009 | Suchy et al. |
| 2009/0089567 A1 | 4/2009 | Boland et al. |
| 2009/0089852 A1 | 4/2009 | Randolph et al. |
| 2009/0106291 A1 | 4/2009 | Ku et al. |
| 2009/0129597 A1 | 5/2009 | Zimmer et al. |
| 2009/0132682 A1 | 5/2009 | Counterman |
| 2009/0132710 A1 | 5/2009 | Pelley |
| 2009/0158148 A1 | 6/2009 | Vellanki et al. |
| 2009/0158272 A1 | 6/2009 | El-Assir et al. |
| 2009/0164471 A1* | 6/2009 | Shen ............... G06F 17/30584 |
| 2009/0164522 A1 | 6/2009 | Fahey |
| 2009/0165099 A1 | 6/2009 | Eldar et al. |
| 2009/0172430 A1 | 7/2009 | Takenouchi |
| 2009/0228629 A1 | 9/2009 | Gebhart et al. |
| 2009/0235349 A1 | 9/2009 | Lai et al. |
| 2009/0240835 A1 | 9/2009 | Adelman et al. |
| 2009/0249296 A1 | 10/2009 | Haenel et al. |
| 2009/0249336 A1 | 10/2009 | Vasilevsky et al. |
| 2009/0249473 A1 | 10/2009 | Cohn |
| 2009/0259665 A1 | 10/2009 | Howe et al. |
| 2009/0265707 A1 | 10/2009 | Goodman et al. |
| 2009/0282404 A1 | 11/2009 | Khandekar et al. |
| 2009/0285199 A1 | 11/2009 | Strahs et al. |
| 2009/0300180 A1 | 12/2009 | DeHaan |
| 2010/0023740 A1 | 1/2010 | Moon et al. |
| 2010/0049838 A1 | 2/2010 | DeHaan |
| 2010/0050169 A1 | 2/2010 | DeHaan |
| 2010/0054156 A1 | 3/2010 | DeHaan |
| 2010/0057833 A1 | 3/2010 | DeHaan |
| 2010/0057890 A1 | 3/2010 | DeHaan |
| 2010/0057913 A1 | 3/2010 | DeHaan |
| 2010/0057930 A1 | 3/2010 | DeHaan |
| 2010/0058307 A1 | 3/2010 | DeHaan |
| 2010/0058327 A1 | 3/2010 | DeHaan |
| 2010/0058328 A1 | 3/2010 | DeHaan |
| 2010/0058330 A1 | 3/2010 | DeHaan |
| 2010/0058332 A1 | 3/2010 | DeHaan |
| 2010/0058444 A1 | 3/2010 | DeHaan |
| 2010/0082799 A1 | 4/2010 | Dehaan et al. |
| 2010/0083245 A1 | 4/2010 | DeHaan |
| 2010/0100876 A1 | 4/2010 | Glover et al. |
| 2010/0128639 A1 | 5/2010 | DeHaan |
| 2010/0131632 A1 | 5/2010 | DeHaan |
| 2010/0131648 A1 | 5/2010 | Dehaan |
| 2010/0138521 A1 | 6/2010 | Dehaan |
| 2010/0138526 A1 | 6/2010 | Dehaan |
| 2010/0138696 A1 | 6/2010 | Dehaan |
| 2010/0217837 A1 | 8/2010 | Ansari |
| 2010/0217840 A1 | 8/2010 | DeHaan et al. |
| 2010/0217843 A1 | 8/2010 | DeHaan et al. |
| 2010/0217848 A1 | 8/2010 | DeHaan et al. |
| 2010/0217944 A1 | 8/2010 | DeHaan et al. |
| 2010/0218243 A1 | 8/2010 | DeHaan et al. |
| 2010/0220584 A1 | 9/2010 | DeHaan et al. |
| 2010/0223367 A1 | 9/2010 | DeHaan |

(56) References Cited

U.S. PATENT DOCUMENTS

| | | | |
|---|---|---|---|
| 2010/0223504 A1 | 9/2010 | DeHaan et al. | |
| 2010/0223607 A1 | 9/2010 | DeHaan | |
| 2010/0223608 A1 | 9/2010 | DeHaan et al. | |
| 2010/0223609 A1 | 9/2010 | DeHaan et al. | |
| 2010/0223610 A1 | 9/2010 | DeHaan et al. | |
| 2010/0235433 A1 | 9/2010 | Ansari et al. | |
| 2010/0250907 A1 | 9/2010 | DeHaan | |
| 2010/0306337 A1 | 12/2010 | DeHaan | |
| 2010/0306380 A1 | 12/2010 | DeHaan | |
| 2010/0333084 A1 | 12/2010 | DeHaan | |
| 2011/0010401 A1* | 1/2011 | Adams | G06F 17/30315 707/805 |
| 2011/0061045 A1 | 3/2011 | Phillips | |
| 2011/0131304 A1 | 6/2011 | Henson | |
| 2011/0131384 A1 | 6/2011 | Henson | |
| 2012/0110458 A1* | 5/2012 | Brown et al. | 715/733 |
| 2012/0151470 A1 | 6/2012 | Dehaan | |
| 2012/0185559 A1 | 7/2012 | Wesley et al. | |

OTHER PUBLICATIONS

Platform. Microsoft® Computer Dictionary, Fifth Edition [online]. Microsoft Press, May 1, 2002. Retrieved on Sep. 29, 2010. Retrieved from the Internet: <URL:http://proquest.safaribooksonline.com/0735614954>.*
Interface. "IEEE 100 The Authoritative Dictionary of IEEE Standards Terms Seventh Edition," IEEE STD 100-2000, vol., No., 2000 [online]. Retrieved on Sep. 8, 2010. Retrieved from the Internet: <URL: http://ieeexplore.ieee.org/servlet/opac?punumber=4116785>.*
Network. "IEEE 100 The Authoritative Dictionary of IEEE Standards Terms Seventh Edition," IEEE STD 100-2000, vol., No., 2000 [online]. Retrieved on Sep. 29, 2010. Retrieved from the Internet: <URL: http://ieeexplore.ieee.org/servlet/opac?punumber=4116785>.*
USPTO Office Action mailed Mar. 31, 2011 for U.S. Appl. No. 12/325,056.
USPTO Office Action mailed Mar. 6, 2012 for U.S. Appl. No. 12/325,056.
USPTO Office Action mailed Jun. 19, 2012 for U.S. Appl. No. 12/325,056.
USPTO Office Action mailed Jun. 28, 2013 for U.S. Appl. No. 12/325,056.
USPTO Notice of Allowance mailed Oct. 21, 2013 for U.S. Appl. No. 12/325,056.
USPTO Office Action mailed Mar. 29, 2010 for U.S. Appl. No. 12/130,424.
USPTO Office Action mailed Dec. 10, 2010 for U.S. Appl. No. 12/130,424.
USPTO Office Action mailed May 2, 2013 for U.S. Appl. No. 12/130,424.
USPTO Office Action mailed Aug. 21, 2013 for U.S. Appl. No. 12/130,424.
USPTO Notice of Allowance mailed Dec. 12, 2013 for U.S. Appl. No. 12/130,424.
USPTO, Office Action for U.S. Appl. No. 12/194,754 mailed Apr. 14, 2010.
USPTO, Final Office Action for U.S. Appl. No. 12/194,754 mailed Dec. 3, 2010.
USPTO, Office Action for U.S. Appl. No. 12/194,754 mailed Oct. 9, 2012.
USPTO, Final Office Action for U.S. Appl. No. 12/194,754 mailed May 21, 2013.
USPTO, Office Action for U.S. Appl. No. 12/194,754 mailed Nov. 25, 2013.
USPTO, Advisory Action for U.S. Appl. No. 12/194,754 mailed Apr. 7, 2011.
USPTO, Advisory Action for U.S. Appl. No. 12/194,754 mailed Jul. 30, 2013.
USPTO Office Action for U.S. Appl. No. 12/395,536, mailed Nov. 8, 2011.
USPTO Office Action for U.S. Appl. No. 12/395,536, mailed Apr. 25, 2012.
USPTO Office Action for U.S. Appl. No. 12/395,536, mailed Nov. 6, 2013.
USPTO Office Action for U.S. Appl. No. 12/395,536, mailed Mar. 24, 2014.
Ziegler et al, "Secure Profile Management in Smart Home Networks," 2005, Retrieved from the Internet <URL: ieeexploreieee.org/xpls/abs_all.jsp?arnumber=1508274>, pp. 1-5 as printed.
Microsoft, "How SNMP Works," <http://technet.microsoft.com/en-us/library/cc783142(v=ws.10).aspx>, retrieved Aug. 14, 2012, 9 pages.
Microsoft, "How to configure Network Security for the Snmp Service in Windows Server 2003," <http://support.microsoft.com/kb/324261>, retrieved Aug. 14, 2012, 3 pages.
"Ellison, UPnP Security ceremonies, 2003, Retrieved from the Internet <URL: upnp.org/specs/sec/UPnP-sec-UPnPSecurityCeremonies-v1.pdf>, pp. 1-18 as printed."
"No stated author, OSGi Service Platform Service Compendium, Apr. 2007, Retrieved from the Internet <URL://osgi.org/download/r4v41 /r4.cmpn.pdf>, pp. 1-5 as printed."
"No stated author, Understanding Universal Plug and Play, Retrieved from the Internet <URL:web.archive.org/web/20030501 OOOOOO*/http://www.upnp.org/download/UPNP understandingUPNP.doc>, pp. 1-45 as printed."
Agarwalla et al. "Automating Provisioning of Complete Software Stack in a Grid Environment," 2004.
Novak, Judit, "Automatic Installation and Configuration for Large Scale Farms", 2005.
Quintero et al., "Introduction to pSeries Provisioning", 2004.
HP Storage Essentials SRM 6.0 Installation Guide. Jan. 2008. HP. 1st ed. Part No. T4283-96113. pp. 1-5, 97-136, 219-228.
HP Storage Essentials SRM 6.0 User Guide. Jan. 2008. HP. 1st ed. Part No. T4238-96114. pp. 1-83.
DeHaan, Michael. "Unified Provisioning". 2007.
DeHaan, Michael. "Provisioning With Cobbler". 2007.
Tan et al. "A WBEM Basked Disk Array Management Provider". 2005. IEEE. 2005 International Conference on Cyberworlds.
Lovelace et al. Managing Disk Subsystems Using IBM TotalStorage Productivity Ceneter. Sep. 2005. IBM. 2nd ed. SG24-7097-01. pp. 1-42.
Grosse, "Repository Mirroring", 1995.
Anderson et al., "Technologies for Large-Scale Configuration Management", Dec. 9, 2002.
Butt et al., "Automated Installation of Large-Scale Linux Networks", 2000.
eBook "Microsoft System Management Server 2003 Administrator's Companion", Microsoft Press. C2004, Ch. 13, Patch Management, pp. 471-507.
Doc Searls "Linux for Suites", 2005, Specialized System Consultants Inc., vol. 2005.
Maghraoui et al., "Model Driven Provisioning: Bridging the Gap Between Declarative Object Models and Procedural Provisioning Tools", 2006.
DeHaan et al., "Methods and Systems for Secure Gated File Deployment Associated with Provisioning", U.S. Appl. No. 12/393,754, filed Feb. 26, 2009.
DeHaan, "Systems and Methods for Integrating Software Provisioning and Configuration Management", U.S. Appl. No. 12/395,379, filed Feb. 27, 2009.
DeHaan, "Systems and Methods for Abstracting Software Content Management in a Software Provisioning Environment", U.S. Appl. No. 12/398,273, filed Feb. 27, 2009.
DeHaan et al., "Systems and Methods for Providing a Library of Virtual Images in a Software Provisioning Environment", U.S. Appl. No. 12/395,351, filed Feb. 27, 2009.
DeHaan et al., "Systems and Methods for Inventorying Un-Provisioned Systems in a Software Provisioning Environment", U.S. Appl. No. 12/391,588, filed Feb. 24, 2009.

(56) References Cited

OTHER PUBLICATIONS

DeHaan et al., "Systems and Methods for Managing Configurations of Storage Devices in a Software Provisioning Environment", U.S. Appl. No. 12/393,613, filed Feb. 26, 2009.
DeHaan et al., "Systems and Methods for Collecting and Altering Firmware Configurations of Target Machines in a Software Provisioning Environment", U.S. Appl. No. 12/393,319, filed Feb. 26, 2009.
DeHaan et al., "Methods and Systems for Replicating Provisioning Servers in a Software Provisioning Environment", U.S. Appl. No. 12/392,508, filed Feb. 25, 2009.
DeHaan, "Systems and Methods for Cloning Target Machines in a Software Provisioning Environment", U.S. Appl. No. 12/473,014, filed May 27, 2009.
DeHaan, "Systems and Methods for Providing Configuration Management Services from a Provisioning Server", U.S. Appl. No. 12/414,941, filed Mar. 31, 2009.
DeHaan, "Systems and Methods for Retiring Target Machines by a Provisioning Server", U.S. Appl. No. 12/475,427, filed May 29, 2009.
DeHaan, "Systems and Methods for Message-Based Installation Management Using Message Bus," U.S. Appl. No. 12/495,077, filed Jun. 30. 2009.
Henson, "Systems and Methods for Integrating Storage Resources from Storage Area Network in Machine Provisioning Platform," U.S. Appl. No. 12/628,041, filed Nov. 30, 2009.
Henson, "Systems and Methods for Mounting Specified Storage Resources from Storage Area Network in Machine Provisioning Platform," U.S. Appl. No. 12/627,988, filed Nov. 20, 2009.
Michael DeHaan, "Methods and Systems for Provisioning Software," U.S. Appl. No. 11/763,315, filed Jun. 14, 2007.
Michael DeHaan, "Methods and Systems for Provisioning Software," U.S. Appl. No. 11/763,333, filed Jun. 14, 2007.
DeHaan, "Methods and Systems for Centrally Managing Provisioning Servers," U.S. Appl. No. 12/201,193, filed Aug. 29, 2006.
DeHaan, "Methods and Systems for Assigning Provisioning Servers in a Software Provisioning Environment," U.S. Appl. No. 12/201,646, filed Aug. 29, 2008.

USPTO Office Action mailed Oct. 7, 2010 for U.S. Appl. No. 11/763,315.
USPTO Office Action mailed Apr. 20, 2011 for U.S. Appl. No. 11/763,315.
USPTO Notice of Allowance mailed Nov. 2, 2011 for U.S. Appl. No. 11/763,315.
USPTO, Advisory Action for U.S. Appl. No. 11/763,315 mailed Jun. 24, 2011.
USPTO Notice of Allowance mailed May 15, 2012 for U.S. Appl. No. 13/399,998.
USPTO Office Action mailed Oct. 7, 2010 for U.S. Appl. No. 11/763,333.
USPTO Office Action mailed Apr. 20, 2011 for U.S. Appl. No. 11/763,333.
USPTO, Advisory Action for U.S. Appl. No. 11/763,333 mailed Jun. 23, 2011.
USPTO Notice of Allowance mailed Oct. 27, 2011 for U.S. Appl. No. 11/763,333.
USPTO Office Action mailed Dec. 20, 2011 for U.S. Appl. No. 12/239,690.
USPTO Office Action mailed May 14, 2012 for U.S. Appl. No. 12/239,690.
USPTO Office Action mailed Dec. 19, 2012 for U.S. Appl. No. 12/239,690.
USPTO Office Action mailed Apr. 16, 2013 for U.S. Appl. No. 12/239,690.
USPTO Office Action mailed Feb. 29, 2012 for U.S. Appl. No. 12/395,351.
USPTO Office Action mailed Jun. 14, 2012 for U.S. Appl. No. 12/395,351.
USPTO Office Action mailed Oct. 11, 2012 for U.S. Appl. No. 12/395,351.
USPTO Office Action mailed Oct. 12, 2010 for U.S. Appl. No. 12/325,056.
USPTO, Advisory Action for U.S. Appl. No. 12/130,424, mailed Feb. 24, 2011, 3 pages.

\* cited by examiner

DEPOPULATION OF USER DATA FROM NETWORK

FIELD

The present teachings relate to systems and methods for the depopulation of user data from a network, and more particularly to platforms and techniques for automatically scanning a network for files, processes, profiles, and/or other data related to a user whose user ID is changed or deactivated in the network.

BACKGROUND OF RELATED ART

A variety of network management platforms exist to assist network administrators with installing and configuring network resources and services. In many platforms, a management server can be used to issue commands to hosts or other network nodes to manage the configuration of the network hosts, underlying clients or other devices. As part of the management of comparatively large-scale and other networks, a network management platform can have the responsibility of maintaining a set of valid user IDs and resources and privileges associated with those user Ids.

It is a not infrequent occurrence in network operations that a user can undergo a change in status in their employment, subscription, or other relationship to the network to which they are registered. In a corporate setting, for example, a user can have a change in marital status and a resulting change in their legal name, or can depart from a company or other organization. In those and other cases, the accumulated files, user profiles, processes, or other resources associated with the user ID for that user may remain in the network.

In existing network management platforms, a systems administrator confronted with a set of obsolete user IDs has no particular tools or services available to them to locate and remote the undesired residual user IDs, and/or associated files, user profiles, processes, or other resources. Those managers therefore must typically access each individual data store, user machine, or other nodes on the managed network, and look for the out-of-date user data. It may thus be desirable to provide methods and systems that overcome these network management difficulties, and permit an administrator or other user to track down and update or remove obsolete user IDs and related user data.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for depopulation of user data from a network. More particularly, embodiments relate to platforms and techniques in one regard for identifying obsolete or unwanted user IDs via a network management server, and automatically scanning the network to which the user IDs are registered to detect user data associated with those IDs. The user data can be or include, for example, executing processes, services, user profiles, application or data files, or other user data authored by, belonging to, or otherwise associated with a user ID. The user data can be stored or hosted in a variety of locations in the network, including, for example, databases or other data stores, servers, personal computers or workstations, removable media, and/or other locations. When a systems administrator or other user desires to begin a purge of obsolete or undesired user IDs and associated user data, the network management platform can commence a full-network scan to comprehensively access and examine all computing, storage, and/or other nodes in the network and search the directories, memory, storage, and/or other resources therein to detect processes, services, files, user profiles, or other user data associated with those user IDs. The network management platform can then perform any desired modification or update to the user IDs and/or associated user data, such as, for example, changing the user IDs or data, exporting the user IDs or data, and/or deleting the user IDs or data. According to embodiments in one regard, the network management platform can thereby locate, update, and/or dispose of obsolete user IDs and/or user data from one central processing point, using comparatively compact global commands.

Reference will now be made in detail to exemplary embodiments of the present teachings, which are illustrated in the accompanying drawings. Where possible the same reference numbers will be used throughout the drawings to refer to the same or like parts.

Figure 1:
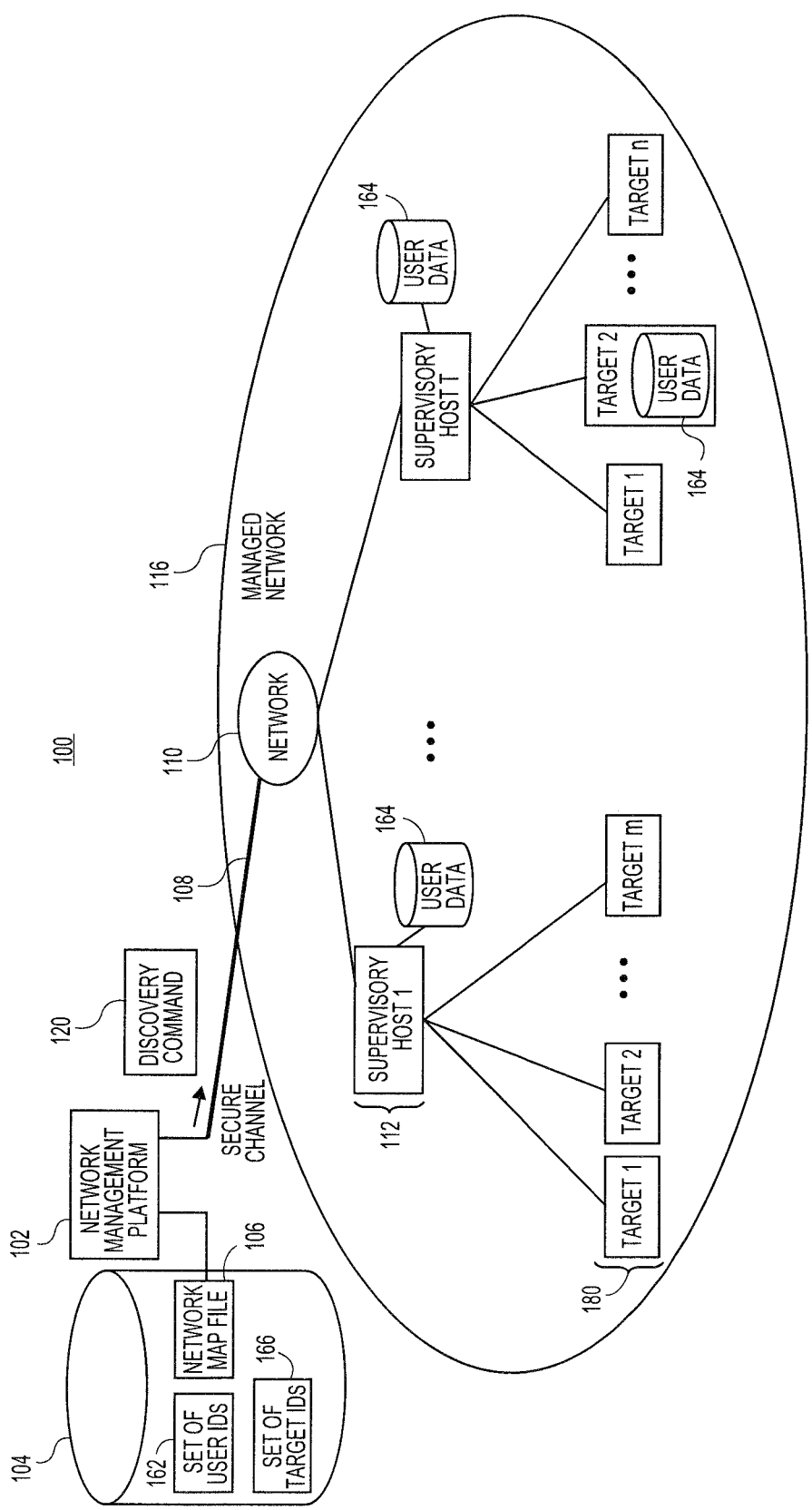
FIG. 1 illustrates an overall network in which systems and methods for depopulation of user data from a network can be implemented, according to various embodiments of the present teachings.

FIG. 1 illustrates an overall system 100 consistent with systems and methods for depopulating user data from a network, according to various embodiments of the present teachings. In embodiments as shown, a network management platform 102 can maintain and manage a managed network 116. Network management platform 102 can communicate with a set of supervisory hosts 112 via one or more networks 110. One or more networks 110 can be or include the Internet, or other public or private networks. One or more networks 110 can be or include wired, wireless, optical, and other network connections. Set of supervisory hosts 112 can be or include a set of servers configured to communicate with entities at other levels of one or more networks 110 and/or associated connections. In embodiments, set of supervisory hosts 112 can communicate with an intermediate set or sets of hosts, gateways, or servers. In embodiments, set of supervisory hosts 112 can function as "overlord" hosts or servers which communicate command data 120 to an underlying or low-level set of targets 180, or other devices in managed network 116.

Set of supervisory hosts 112 can support or serve an underlying managed network 116, for example via a local area network, or other network(s) or connections. Managed network 116 including set of targets 180 can be or include a set of personal computers, network-enabled media devices, or other clients, devices, or machines. Other hierarchies, topologies, and connections between network management platform 102, set of supervisory hosts 112, any intermediate hosts, set of targets 180, and/or other entities or devices of managed network 116 can be used. In embodiments, communications between network management platform 102, set of supervisory hosts 112, set of targets 180, and/or other entities or devices in managed network 116 or other entities can be conducted via one or more secure channel 108, such as the secure channel and related resources described in co-pending U.S. application Ser. No. 12/130,424, filed May 30, 2008, entitled "Systems and Methods for Remote Management of Networked Systems Using Secure Modular Platform," which published as U.S. Patent Application Publication No. 2009/0300180, assigned or under obligation of assignment to the same entity as this application, and which application is incorporated by reference herein.

Network management platform 102 can include or access resources to support the generation and transmission of one or more discovery command 120 via auto-discovered or other pathways to manage set of supervisory hosts 112, set of targets 180, and/or other entities or devices of managed network 116, including a network store 104. Network store 104 can be or include a database or other data store, and in embodiments can store a network map 106. Network map 106 can record information related to the configuration and topology of network connections between set of supervisory hosts 112, set of targets 180, and/or other entities or devices of managed network 116, as well as other data. In embodiments, network map 106 can be recorded in a file, tree, database, or other record.

According to embodiments in one regard, network management platform 102 can access network map 106 to carry out management and maintenance operations on set of user IDs 162. Set of user IDs 162 can contain a set of user names, account names, account numbers, stored passwords, and/or other resources related to the identification and/or validation of users of managed network 116. According to embodiments, in general, each user ID in set of users IDs 162 can have an associated set of user data 164 hosted, stored, or located throughout the network of managed network 116.

Set of user data 164 can be or include any one or more of processes, services, user profiles, data files such as database, word processing, spreadsheet, media, or other data files, application files, passwords or other credentials, and/or other data related to the user identified by a given user ID in set of user IDs 162. Portions of user data in set of user data 164 can be located in diverse or multiple locations, such as in local or remote servers, personal computers or other client machines or devices, workstations, network-enabled mobile devices, databases, archives or RAID sites, or other nodes, facilities, or locations in managed network 116. Set of user data 164 can further comprise, for instance, files that contain references to a user ID which control access to applications or services, such as "/etc/group/." Set of user data 164 can likewise include information such as aliases, groups, access control lists (ACLs), references by user ID or user name, or other information.

Network management platform 102 can determine a set of target IDs 166 in set of user IDs 162 to locate, modify, and/or remove set of user data 164 in or from managed network 116 and/or associated network or networks. In embodiments, set of target IDs 166 can be imported to network management platform 102, and/or can be manually specified by a systems administrator or other user. In embodiments, set of target IDs 166 can be generated by network management platform 102, for example, by identifying all user IDs that have not been used for a defined period of time, such as one year or other period of time.

Figure 2:
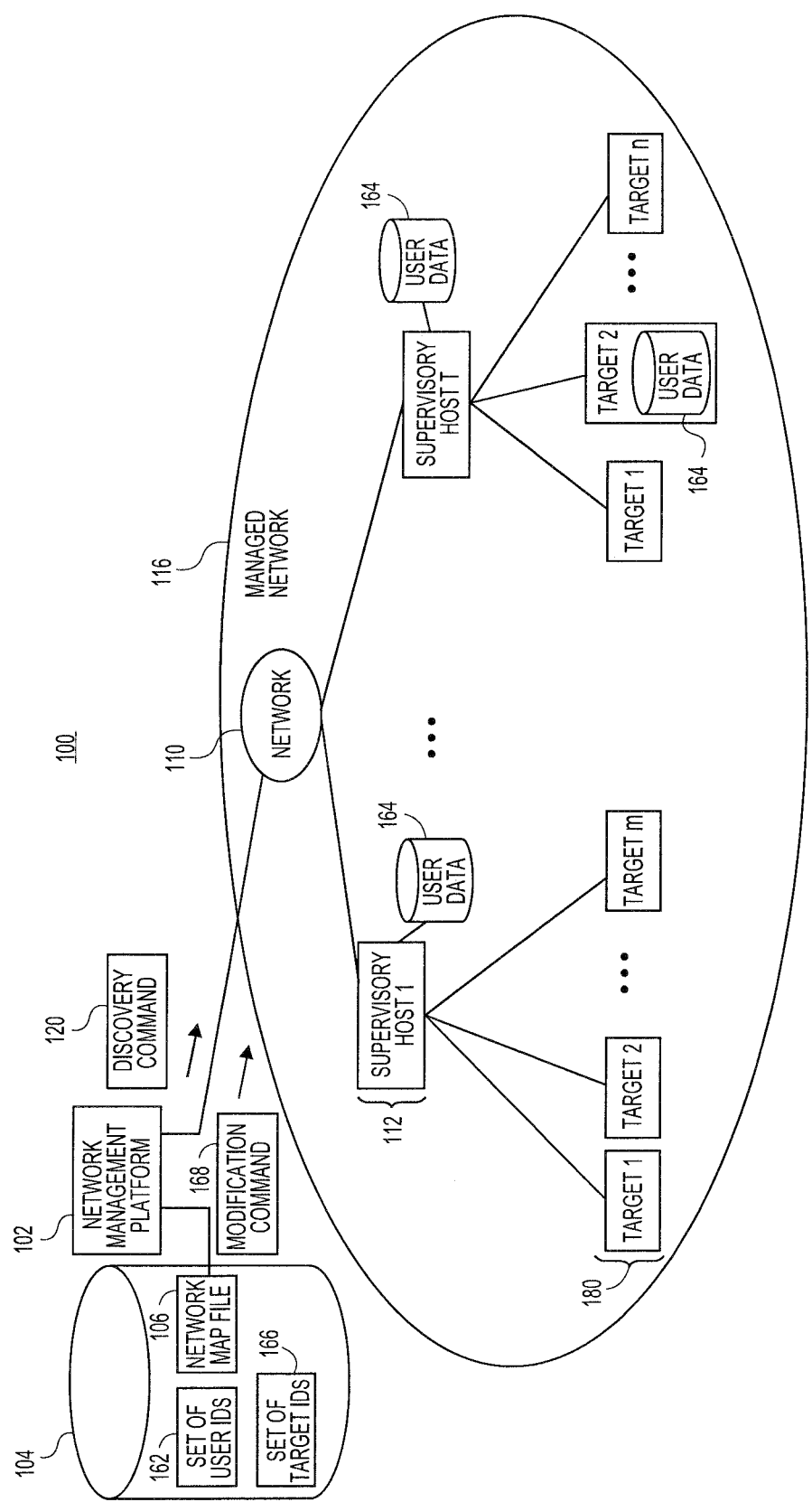
FIG. 2 illustrates an overall network in which systems and methods for depopulation of user data from a network can be implemented, according to various embodiments of the present teachings in further regards.

As for instance illustrated in FIG. 2, once network management platform 102 has accessed, received, or generated set of target IDs 166, network management platform 102 can issue commands and/or invoke services to locate, modify, and/or purge set of target. IDs 166 and/or set of user data 164 associated with each of those user IDs. Network management platform 102 can generate one or more discovery command 120 to transmit to set of supervisory hosts 112, managed network 116, one or more networks 110, and/or other machines, locations, or resources. One or more discovery command 120 can contain an identification of set of target IDs 166 and other data to locate, identify, authenticate, and/or set of user data 164 associated with those IDs in the overall network. When network management platform 102 generates one or more discovery command 120, network management platform 102 can access network map 106 to identify one or more supervisory hosts in set of supervisory hosts 112 to or through which to transmit one or more discovery command 120. The recipient supervisory host(s) can receive one or more discovery command 120 and, in embodiments, access network map 106 and/or communicate with network management platform 102 to extract a pathway by which to relay or transmit one or more discovery command 120 to managed network 116 and/or other underlying devices. The supervisory host(s) can then transmit or relay the one or more discovery command 120 to a target or targets in managed network 116, using the identified pathway.

In embodiments, network management platform 102 can receive data back from set of supervisory hosts 112, managed network 116, and/or other resources indicating the presence of user data 164 for one or more user IDs in set of target IDs 166. Upon detection of user data 164 for those user IDs, network management platform 102 can proceed to generate one or more modification command 168 to initiate a modification, update, migration, and/or deletion or removal of a portion or all of user data 164, and/or set of target IDs 166. For example, network management platform 102 can direct that files, directories, user profiles, and/or executing processes can be modified, updated, deleted, archived, terminated, removed, or otherwise processed to purge obsolete, inaccurate, insecure, or unwanted data. In embodiments, the modification can include substituting a new user ID for an obsolete user ID. In embodiments, the modification can include substituting new credentials, privileges, or other attributes for the existing attributes for the subject user ID. Other modifications or processing of set of target IDs 166 can be done. For example, two or more user IDs and associated user data 164 can be combined, or a single user ID can be split into multiple user data 164, IDs, or attributes.

According to various embodiments, network management platform 102 can be configured to periodically probe the network including set of manage machines 116, set of supervisory hosts 112, and/or other resources with repeated or additional one or more discovery command 120, to locate files, processes, and/or other user data 164 that was not present, visible, or identifiable during previous scans. In embodiments, a process of repeatedly interrogating the network for user data 164 can be repeated until a termination criteria are met, such as, for instance, the failure to discover any further user data 164 after a predetermined number of discovery attempts, or after a certain amount of time.

In terms of operational scope, it will be appreciated that any of network management platform 102, set of supervisory hosts 112, any intermediate hosts, and/or managed network 116 or other entities can be significantly or substantially geographically distributed, and can represent relatively large-scale groupings or clusters. For instance, different hosts in set of supervisory hosts 112 and/or associated targets in managed network 116 can be located in different metropolitan areas, in different sections of a country, in different countries, or in different continents. For further instance, different hosts in set of supervisory hosts 112 and/or sets of targets in managed network 116 can represent hundreds, thousands, or greater or lesser numbers of collective devices.

Figure 3:
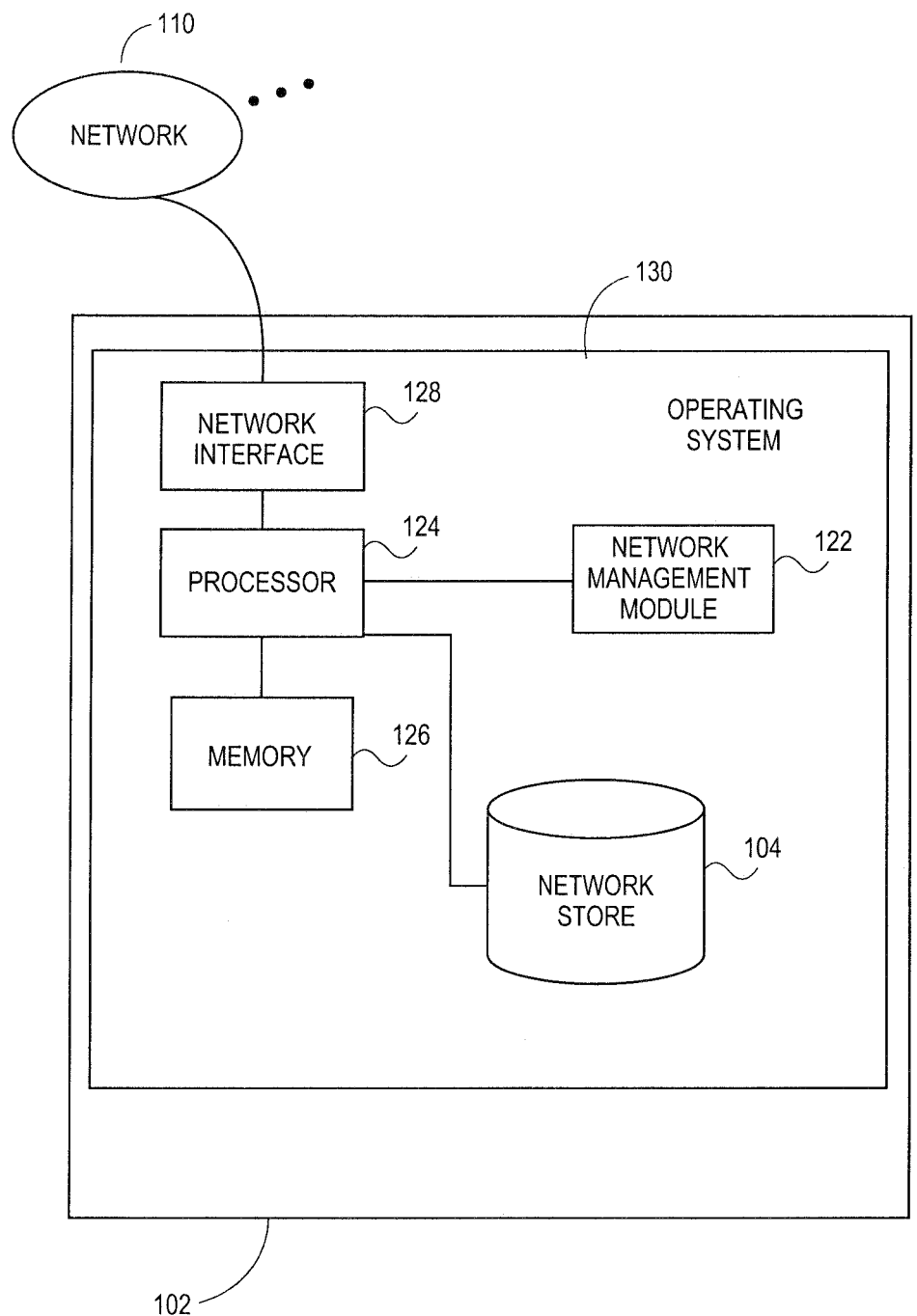
FIG. 3 illustrates an exemplary hardware configuration of a network management platform that can be used in systems and methods for depopulation of user data from a network, according to various embodiments of the present teachings.

FIG. 3 illustrates an exemplary diagram of hardware and other resources that can be incorporated in a network management platform 102 configured to communicate with set of supervisory hosts 112, any intermediate hosts, set of targets 180, and/or other entities or devices of managed network 116 via one or more networks 110 or other connections, according to embodiments. In embodiments as shown, network management system 102 can comprise a processor 124 communicating with memory 126, such as electronic random access memory, operating under control of or in conjunction with operating system 130. Operating system 130 can be, for example, a distribution of the Linux™ operating system, the Unix™ operating system, or other open-source or proprietary operating system or platform. Processor 124 also communicates with network store 104, such as a database stored on a local hard drive. Processor 124 further communicates with network interface 128, such as an Ethernet or wireless data connection, which in turn communicates with one or more networks 110, such as the Internet or other public or private networks. Processor 124 also communicates with a network management module 132, which can be or include logic to monitor and manage the operation of network 110 and associated or connected resources. Network management module 132 can for instance permit a user to view, delegate, and execute configuration operations in set of supervisory hosts 112, set of targets 180, managed network 116, and/or other resources or entities. Other configurations of network management system 102, associated network connections, and other hardware and software resources are possible.

Figure 4:
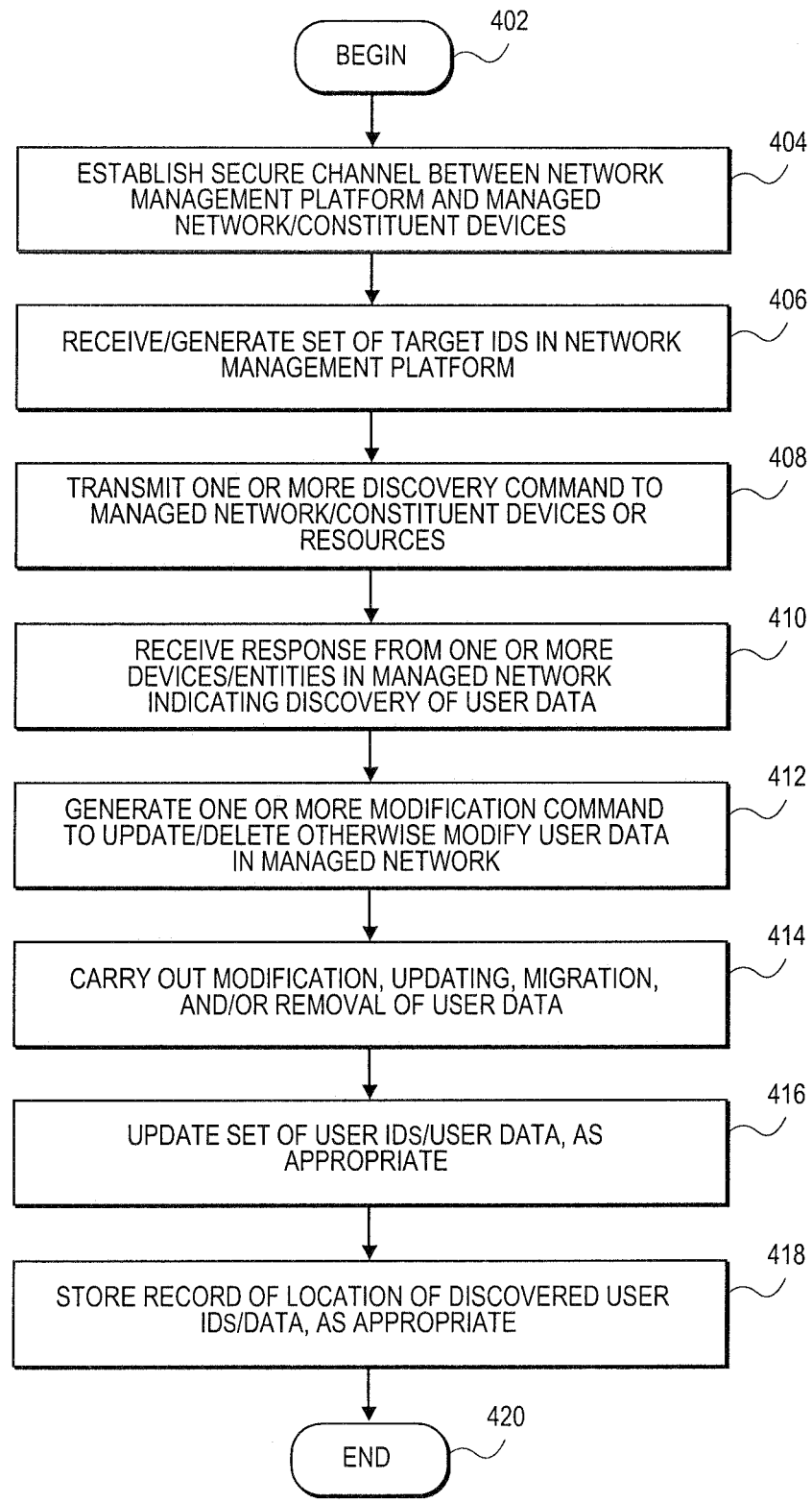
FIG. 4 illustrates overall network management processing for depopulation of user data from a network can be implemented, according to various embodiments of the present teachings.

FIG. 4 illustrates overall processing for depopulation of user data from a network, according to various embodiments of the present teachings. In 402, processing can begin. In 404, a secure channel 108 can be established between network management platform 102 and one or more networks 110, set of supervisory hosts 112, set of targets 180, and/or other entities or devices of managed network 116. In embodiments, secure channel 108 can be or include a secure socket layer (SSL) connection, a public/private key infrastructure or connection, or other channel or connection. In 406, network management platform 102 can access, receive, or generate set of target IDs 166 reflecting user IDs whose associated user data 164 is to be scanned for in the overall network. In 408, network management platform 102 can transmit one or more discovery command 120 to one or more networks 110, set of supervisory hosts 112, set of targets 180, or other devices, entities or resources of managed network 116. In 410, network management platform 102 can receive one or more responses from the network indicating the presence of user data 164 associated with set of target IDs 166. User data 164 can be or include processes, services, user profiles, data files, application files, and/or other data.

In 412, network management platform 102 can proceed to generate one or more modification command 168 to initiate a modification, update, and/or deletion or removal of a portion or all of user data 164, and/or set of target Ds 166. For example, network management platform 102 can direct that files, directories, user profiles, and/or executing processes can be modified, updated, deleted, archived, terminated, removed, or otherwise processed to purge obsolete, inaccurate, insecure, or unwanted data. In 414, the modification, updating, and/or deletion of user data 164 can be carried out. In 416, network management platform 102 can update set of user IDs 162 and/or any user data 164 to reflect the modifications or deletions, as appropriate. In 418, network management platform 102 can store a record of all locations in which one or more of set of target IDs 166 and/or user data 164 were found, to record a map of user ID/user data repositories within the network, as appropriate. In 420, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which configuration commands or other data are generated and transmitted from one network management platform 102, in embodiments more than one server or other device or resource can serve as a central control point. For further example, while embodiments have been described in which one or more hosts in a set of supervisory hosts 112 coordinate the distribution of commands and data to a managed network 116, in embodiments, implementations can involve the dissemination of commands or other data through different network hierarchies, trees, nodes, or arrangements. For instance, in embodiments, commands or other data can be delegated via supervisory hosts through more than two sub-hosts or other sub-levels. For yet further example, while embodiments have been described involving one level or layer of supervisory hosts, in embodiments, the overall network can be configured with multiple levels or layers of supervisory hosts (or "overlords"). Similarly, various targets in managed network 116 can be configured at different levels within the overall network. For further example, while in embodiments the depopulation activity has been described as operating on a set of user IDs 162 and target IDs 166, in embodiments, other types of identifiers can be used. For example, in embodiments user data 164 associated with a given address, such as an Internet Protocol (IP) address, or other address or identifier, can be used to identify users or other entities for modification and/or removal. Other resources described as singular or integrated can in embodiments be plural or distributed, and resources described as multiple or distributed can in embodiments be combined. The scope of the present teachings is accordingly intended to be limited only by the following claims.

What is claimed is:
1. A method comprising:
 identifying, by a processing device of a network management platform, at least one user ID associated with at least one user having a changed status in a network, wherein the network is associated with the network management platform, data sources, and user data;
 identifying, by the processing device of the network management platform, data sources hosting a set of user processes, a set of files, and a set of user profiles in the network;

accessing communication paths between the network management platform and the processing device-identified data sources hosting the set of user processes, the set of files, and the set of user profiles in the network;

generating a discovery command in view of the processing device-identified data sources;

transmitting the discovery command from the network management platform to the processing device-identified data sources hosting the set of user processes, the set of files, and the set of user profiles in the network;

receiving a response to the discovery command in the network management platform, the response indicating presence of user data in the data sources in view of the communication paths;

identifying non-indexed user data associated with the at least one user ID in the data sources in view of the response to the discovery command; and modifying the non-indexed user data in the network in view of the changed status of the at least one user.

2. The method of claim 1, wherein the modifying comprises migrating the non-indexed user data from the at least one user ID to at least a second user ID.

3. The method of claim 1, wherein the modifying comprises deleting the non-indexed user data associated with the at least one user ID from the network.

4. The method of claim 1, wherein transmitting the discovery command comprises communicating with available nodes in the network via a secure channel to identify the non-indexed user data associated with the at least one user ID.

5. The method of claim 1, wherein the changed status of the at least one user comprises at least one of a change in user name, a change in network user ID, a change in employment status, a change in level of security access level, or a change in network subscription status.

6. The method of claim 1, wherein transmitting the discovery command comprises multiple scanning of the network repeated until termination criteria are met.

7. A system, comprising:
an interface to a network, wherein the network is associated with a network management platform, data sources, and user data; and a processing device of the network management platform to communicate via the interface with the network to:
identify at least one user ID associated with at least one user having a changed status in the network;
identify data sources hosting a set of user processes, a set of files, and a set of user profiles in the network;
access communication paths between the network management platform and the processing device-identified data sources hosting the set of user processes, the set of files, and the set of user profiles in the network;
generate a discovery command in view of the processing device-identified data sources;
transmit the discovery command from the network management platform to the processing device-identified data sources hosting the set of user processes, the set of files, and the set of user profiles in the network;
receive a response to the discovery command in the network management platform, the response to indicate presence of user data in the data sources in view of the communication paths;
identify non-indexed user data associated with the at least one user ID in the data sources in view of the response to the discovery command; and
modify the non-indexed user data in the network in view of the changed status of the at least one user.

8. The system of claim 7, wherein the processing device is further to migrate the non-indexed user data from the at least one user ID to at least a second user ID.

9. The system of claim 7, wherein the processing device is further to delete the non-indexed user data associated with the at least one user ID from the network.

10. The system of claim 7, wherein the processing device is further to communicate with available nodes in the network via a secure channel to identify the non-indexed user data associated with the at least one user ID.

11. The system of claim 7, wherein the changed status of the at least one user comprises at least one of a change in user name, a change in network user ID, a change in employment status, a change in level of security access level, or a change in network subscription status.

12. The system of claim 7, wherein the processing device is further to repeat scanning of the network until termination criteria are met.

13. A non-transitory computer readable medium storing instructions which, when executed, cause a processing device to:
identify, by the processing device of a network management platform, at least one user ID associated with at least one user having a changed status in a network, wherein the network is associated with the network management platform, data sources, and user data;
identify, by the processing device of the network management platform, data sources hosting a set of user processes, a set of files, and a set of user profiles in the network;
generating a discovery command in view of the processing device-identified data sources;
transmit the discovery command from the network management platform to the processing device-identified data sources hosting the set of user processes, the set of files, and the set of user profiles in the network;
access communication paths between the network management platform and the processing device-identified data sources hosting the set of user processes, the set of files, and the set of user profiles in the network;
receive a response to the discovery command in the network management platform, the response to indicate presence of user data in the data sources in view of the communication paths;
identify non-indexed user data associated with the at least one user ID in the data sources in view of the response to the discovery command; and
modify the non-indexed user data in the network in view of the changed status of the at least one user.

14. The non-transitory computer readable medium of claim 13, wherein to modify, the processing device is further to migrate the non-indexed user data from the at least one user ID to at least a second user ID.

15. The non-transitory computer readable medium of claim 13, wherein to modify, the processing device is further to delete the non-indexed user data associated with the at least one user ID from the network.

16. The non-transitory computer readable medium of claim 13, wherein to transmit the discovery command, the processing device is further to communicate with available nodes in the network via a secure channel to identify the non-indexed user data associated with the at least one user ID.

17. The non-transitory computer readable medium of claim 13, wherein the changed status of the at least one user comprises at least one of a change in user name, a change in network user ID, a change in employment status, a change in level of security access level, or a change in network subscription status.

18. The non-transitory computer readable medium of claim 13, wherein to transmit the discovery command comprises multiple scanning of the network repeated until termination criteria are met.

\* \* \* \* \*